US009143325B2

(12) United States Patent
Chen et al.

(10) Patent No.: US 9,143,325 B2
(45) Date of Patent: Sep. 22, 2015

(54) MASKING WITH SHARED RANDOM BITS

(71) Applicant: Microsoft Corporation, Redmond, WA (US)

(72) Inventors: Zhimin Chen, Sunnyvale, CA (US); Jay Scott Fuller, Scotts Valley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 250 days.

(21) Appl. No.: 13/715,579

(22) Filed: Dec. 14, 2012

(65) Prior Publication Data
US 2014/0169553 A1 Jun. 19, 2014

(51) Int. Cl.
| H04K 1/00 | (2006.01) |
| H04L 9/00 | (2006.01) |
| H04L 9/28 | (2006.01) |
| G06F 7/72 | (2006.01) |

(52) U.S. Cl.
CPC ............ *H04L 9/28* (2013.01); *G06F 7/724* (2013.01); *G06F 7/726* (2013.01); *G06F 2207/7233* (2013.01)

(58) Field of Classification Search
CPC . G06F 7/724; G06F 7/726; G06F 2207/7219; G06F 2207/7233
USPC .......................................................... 380/28
See application file for complete search history.

(56) References Cited

U.S. PATENT DOCUMENTS

| 7,848,515 B2 | 12/2010 | Dupaquis et al. |
| 2006/0200514 A1* | 9/2006 | Fischer et al. ................. 708/446 |
| 2009/0086976 A1 | 4/2009 | Scian |
| 2009/0113217 A1 | 4/2009 | Dolgunov et al. |
| 2011/0055591 A1 | 3/2011 | Rivain et al. |

OTHER PUBLICATIONS

Rivain et al., "Provably Secure Higher-Order Masking of AES", Mangard, S., Standaert, F.-X. (eds.) CHES 2010. LNCS, vol. 6225, pp. 413-427. Springer, Heidelberg (2010).*
Oswald et al., "A Side-Channel Analysis Resistant Description of the AES S-Box", Booktitle: Fast Software Encryption: 12th International Workshop, FSE 2005, Paris, France, vol. 3557, pp. 413-423.*
Canright, D. et al., "A Very Compact "Perfectly Masked" S-Box for AES", 6th International Conference on Applied Cryptography and Network Security, Jun. 3, 2008, 15 pages.
Kim, H. et al., "A Fast and Provably Secure Higher-Order Masking of AES S-box", Workshop on Cryptographic Hardware and Embedded Systems 2011, Sep. 29, 2011, 20 pages.
Carlet, C. et al., "Higher-Order Masking Schemes for S-Boxes", 19th International Workshop on Fast Software Encryption, Mar. 19, 2012, 20 pages.

(Continued)

*Primary Examiner* — Andrew Nalven
*Assistant Examiner* — Khang Do
(74) *Attorney, Agent, or Firm* — Julie Kane Akhter; Danielle Johnston-Holmes; Micky Minhas

(57) ABSTRACT

A non-linear transformation including a plurality of non-linear logical operations is masked to a second or higher order. The masking includes receiving a set of random bits, and machine-masking two or more of the plurality of non-linear logical operations with a same random bit from the set of random bits.

19 Claims, 6 Drawing Sheets

(56) References Cited

OTHER PUBLICATIONS

Standaert, F. et al., "The World is Not Enough: Another Look on Second-Order DPA", 16th International Conference on the Theory and Application of Cryptology and Information Security, Dec. 5, 2010, 21 pages.

ISA European Patent Office, International Search Report & Written Opinion for PCT Patent Application No. PCT/US2013/074811, Mar. 31, 2014, 10 Pages.

Prouff, et al., "A Generic Method for Secure SBox Implementation", In International Workshop on Information Security Applications, vol. 4867, Aug. 27, 2007, pp. 227-244.

Nassar, et al., "Formal Analysis of the Entropy/Security Trade-off in First-Order Masking Countermeasures Against Side-Channel Attacks", In International Conference on Cryptology in India, vol. 7107, Dec. 11, 2011, pp. 22-39.

Maghrebi, et al., "Register Leakage Masking Using Gray Code", In International Symposium on Hardware-Oriented Security and Trust, Jun. 3, 2012, pp. 37-42.

Rivain, et al., "Block Ciphers Implementations Provably Secure Against Second Order Side Channel Analysis", In International Workshop on Fast Software Encryption, vol. 5086, Feb. 10, 2008, pp. 127-143.

\* cited by examiner

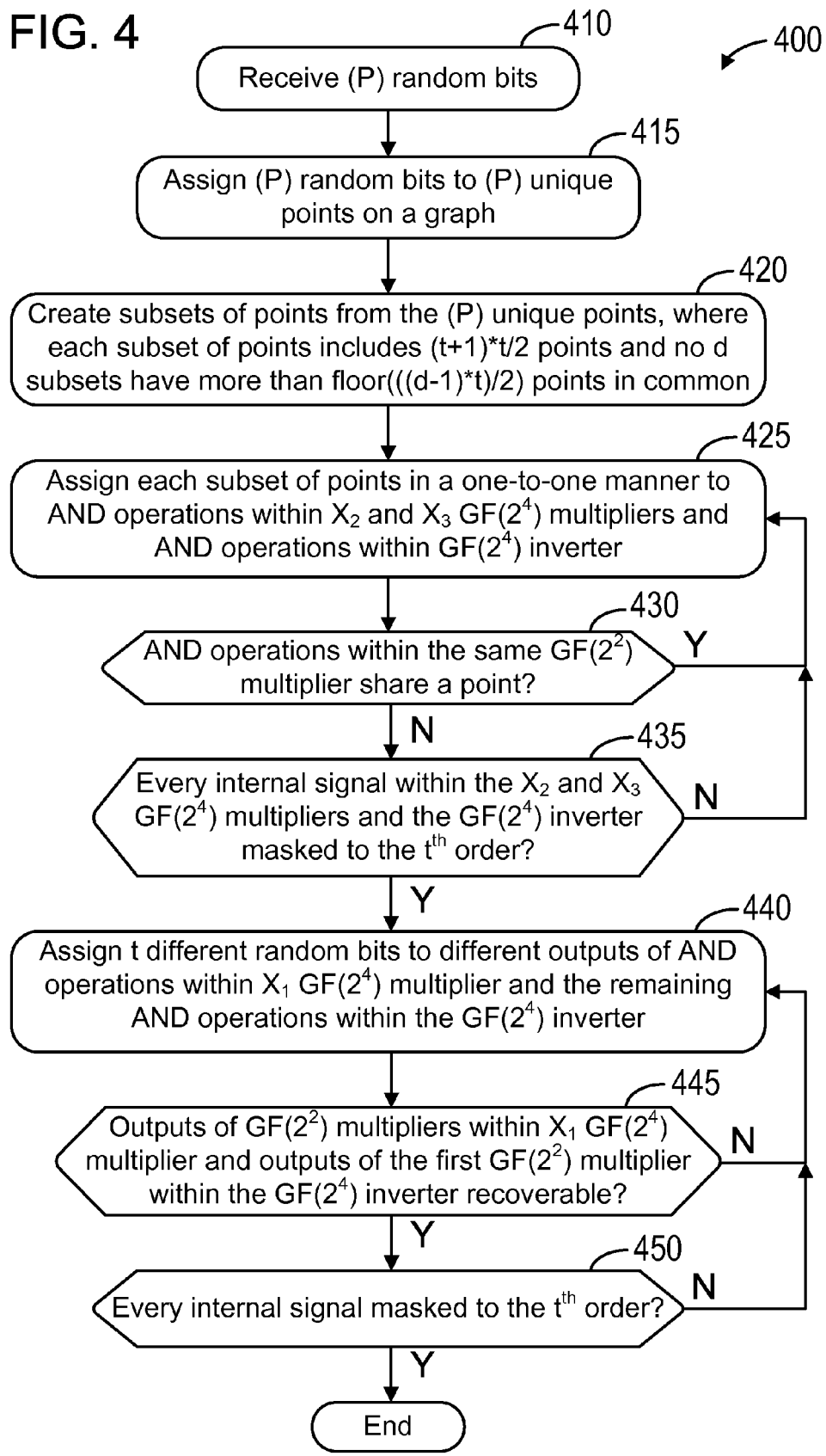

MASKING WITH SHARED RANDOM BITS

BACKGROUND

Hardware implementations of cryptosystems are susceptible to side channel attacks. A side channel attack does not use brute force or a theoretical weakness in a cryptographic algorithm to defeat a cryptosystem, but instead relies on information gained from the physical implementation of the cryptosystem. For example, electromagnetic leaks can be analyzed and exploited to defeat a cryptosystem. To counteract side channel attacks, internal operations of the cryptosystem may be masked with random bits. With first order masking, an internal operation is masked with one random bit. Such first order masking offers some protection, but generally is not considered strong enough for very sensitive information. With second order masking, an internal operation is masked with two or more random bits. Second order masking provides security deemed sufficient for most information. Third and higher order masking provides even stronger security, but can be computationally expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A non-linear transformation may include a plurality of different non-linear logical operations. Two or more of these non-linear logical operations may be masked with a same random bit.

BRIEF DESCRIPTION OF THE DRAWINGS

FIG. 4 shows an example method of determining the sharing of random bits in accordance with an embodiment of the present disclosure.

DETAILED DESCRIPTION

Non-linear transformations masked to the second or higher order can use a very large number of random bits. For example, until now it is believed that a second order masked implementation of the Advanced Encryption Standard (AES) algorithm uses more than seventeen thousand random bits to process a 128-bit data block. This can result in a very high computational expense (e.g., high gate count, high power consumption, and/or long run time).

As discussed herein, the number of random bits can be greatly reduced without sacrificing protection. This is accomplished by strategically reusing the same random bit to mask different operations. As used herein, the term "random bit" is used to refer to a bit that is assigned a value in a manner that makes it impractical to pre-determine the value. The value may be assigned randomly, pseudo randomly, or in any manner that makes it impractical to recognize a pattern of the assigned values. As discussed in detail below, a random bit that is assigned a particular value once may be used to mask more than one operation. In other words, the value (e.g., 0 or 1) assigned to the random bit is only generated once, and this value may be reused or shared by different operations. This is in contrast to an approach in which there is no sharing and a new random value (e.g., 0 or 1) is generated for each operation. When used as a noun in reference to a signal or an operation, the term "mask" refers to the non-empty set of random bits used to randomize the signal or operation.

The herein described sharing of random bits may be used to reduce the total number of random bits that are used to perform a variety of different non-linear transformations. An Advanced Encryption Standard algorithm masked to the $t^{th}$ order is provided as one nonlimiting example. However, it is to be understood that the bit sharing described with reference to the Advanced Encryption Standard algorithm may be applied to different non-linear transformations without departing from the intended scope of this disclosure.

Figure 1:
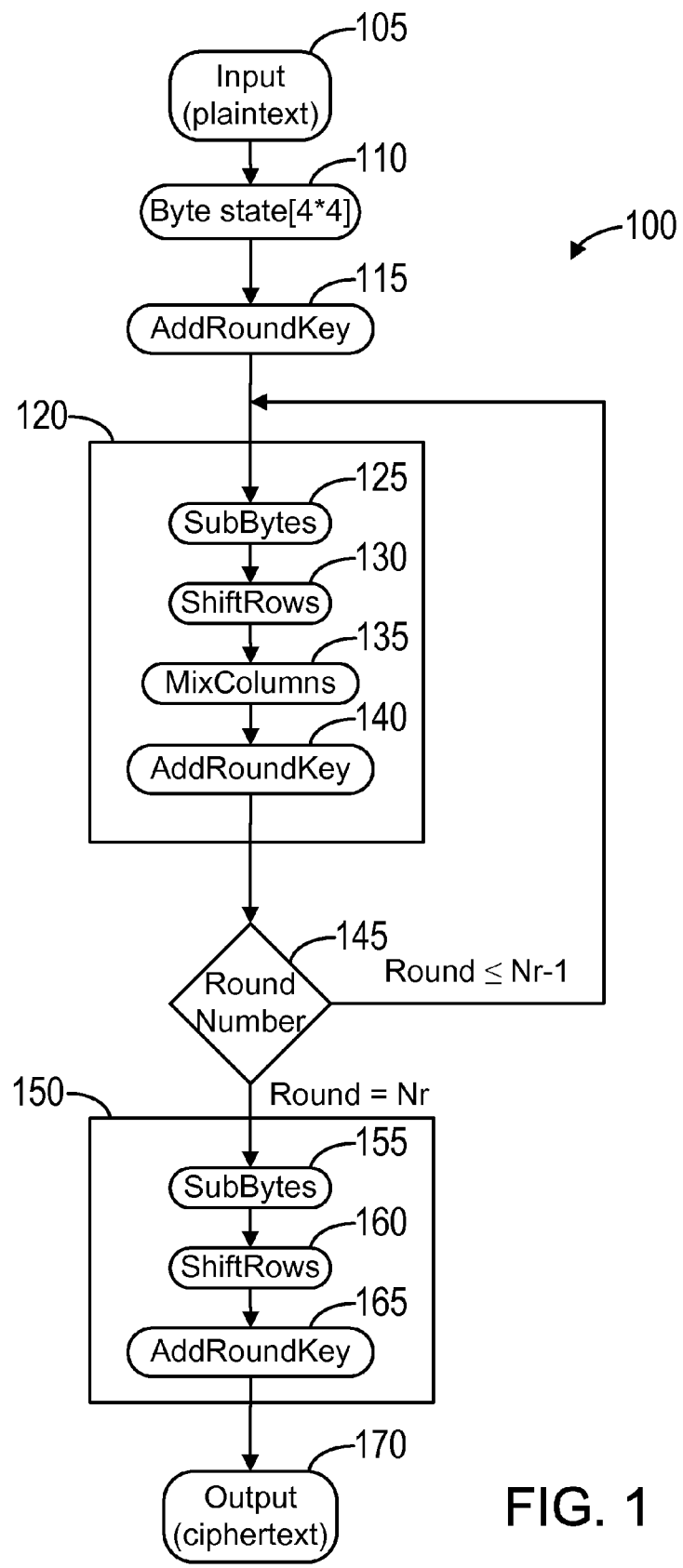
FIG. 1 shows an example cryptographic method in accordance with an embodiment of the present disclosure.

FIG. 1 shows an example data flow of an AES algorithm 100. The AES algorithm is based on polynomial operations in a Galois Field $GF(2^8)$, also called Binary Field, and is defined by an irreducible polynomial $x^8+x^4+x^3+x+1$ with a characteristic 2. The AES algorithm 100 processes data blocks of 128 bits, using a cipher key with a length of 128, 192, or 256 bits. The algorithm includes two parts: the main datapath and the key expansion unit (not shown). The key expansion unit generates a set of 128-bit long sub-keys, referred to as the key schedule, using the cipher key. The main data path is 128-bit wide, and iterates to generate the cipher results in this example algorithm.

As shown in FIG. 1, AES algorithm 100 may begin at 105 with the input of an unencrypted, or plaintext 128 bit data block. At 110, the AES algorithm transforms the plaintext input into a 4*4 matrix herein referred to as the "state." The term "state" may refer to this unencrypted 4*4 matrix or any intermediate 4*4 matrix generated by AES algorithm 100. Each element of the 4*4 matrix includes a byte. At 115, the AES algorithm includes an AddRoundKey transformation of the state. The AddRoundKey transformation XOR-combines the state with a first 128-bit sub-key, known as a RoundKey. AES algorithm 100 may then set the Round number equal to 1.

AES algorithm 100 then iterates a number of rounds, each round 120 includes 4 transformations. At 125, the state undergoes a SubBytes transformation, at 130 the state undergoes a ShiftRows transformation, at 135 the state undergoes a MixColumns transformation, and at 140 the state undergoes an AddRoundKey transformation. Each round takes a data block of length 128 bits and generates a new data block of length 128 bits, utilizing a unique sub-key from the Key Schedule for each round. In this way, each newly generated data block serves as the input of the next round or, in the case of the last round, as the cipher result. Different rounds use different sub-keys but have the same basic structure.

The SubBytes transformation includes 16 byte substitutions. Each byte substitution is a non-linear transformation that includes a Multiplicative Inverse transformation and an Affine transformation. The substitution may also be executed as an S-Box lookup operation. Each byte of the state undergoes a byte substitution in this manner. The SubBytes transformation and masking thereof is discussed in greater detail below with reference to FIGS. 2-5.

The ShiftRows transformation includes a circular left shift of each row of the 4*4 state. Rows 1-4 of the state are left-shifted by offsets of 0-3 bytes, respectively.

The MixColumns transformation operates on the 4 individual columns of the state, where each column is treated as a polynomial. Each column is multiplied by the fixed polynomial $\{03\}x^3+\{01\}x^2+\{01\}x+\{02\}$ modulo $x^4+1$.

At 140, the state undergoes an AddRoundKey transformation utilizing a new sub-key from the Key Schedule.

At 145, AES algorithm 100 adds 1 to the Round number. If the Round number is less than or equal to (Nr−1), AES algorithm 100 returns to 125 and initiates another round 120 of transformations. If the Round number is equal to Nr, AES algorithm 100 proceeds to final round 150. Nr is determined by the length of the cipher key. For a 128 bit cipher key, Nr is equal to 10. For a 192 bit cipher key, Nr is equal to 12. For a 256 bit cipher key, Nr is equal to 14.

Final round 150 includes three transformations. At 155 the state undergoes a SubBytes transformation, at 160, the state undergoes a ShiftRows transformation, and at 165 the state undergoes an AddRoundKey transformation. Final round 150 omits the MixColumns transformation of round 120. Following the AddRoundKey transformation at 165, at 170 AES algorithm 100 outputs the final encrypted data block, or ciphertext.

A decryption algorithm (not shown) may be used to recover the original plain text input from the ciphertext output generated by AES algorithm 100. The transformations in AES algorithm 100 may be inverted and then implemented in reverse order to decrypt the ciphertext. The decryption algorithm may begin with the conversion of the ciphertext to a 4*4 matrix, followed by an AddRoundKey transformation of this state with a RoundKey selected from a unique Key Schedule. The Key Schedule for decryption may include the same sub-keys used for encryption, but with the order reversed. The decryption algorithm may then iterate for (Nr−1) rounds, each round including an InvShiftRows transformation, an InvSubBytes transformation, an AddRoundKey transformation, and an InvMixColumns transformation. Each round takes a data block of length 128 bits and generates a new data block of length 128 bits, utilizing a unique sub-key from the Key Schedule for each round. The final round of the decryption algorithm may include an InvShiftRows transformation, an InvSubBytes transformation and an AddRoundKey transformation. The state may then be converted to plaintext.

The InvShiftRows transformation is the inverse of the ShiftRows transformation. Rows 2-4 of the state are right-shifted by 1-3 bytes, respectively. The InvMixRows transformation treats every column of the state as a polynomial over $GF(2^8)$ and multiplies that polynomial by a fixed polynomial $\{0B\}x^3+\{0D\}x^2+\{09\}x+\{0E\}$ modulo $x^4+1$. The InvSubBytes transformation is applied to each byte of the state, and includes an inverse affine transformation, followed by taking the multiplicative inverse in $GF(2^8)$. This may be applied by using an inverse S-Box. AddRoundKey includes an XOR addition, and is thus its own inverse transformation.

For security and efficiency considerations, the AES algorithm need not be implemented directly over $GF(2^8)$. Rather, every input, including the plaintext or ciphertext and the cipher key, may be transformed into a composite field $GF((2^4)^2)$, then further into $GF((2^2)^2)^2)$, and eventually to $GF(((2)^2)^2)^2)$. In $GF((2^4)^2)$, a number (i) may be represented as $i=i_1x+i_0$, where $x^2+x+\alpha=0$, and $i_0, i_1 \in GF(2^4)$. In $GF((2^2)^2)$, a number (j) may be represented as $j=j_1x+j_0$, where $x^2+x+\beta=0$, and $j_0, j_1 \in GF(2^2)$. In $GF(2^2)$, a number (k) may be represented as $k=k_1x+k_0$, where $x^2+x+1=0$, and $k_0, k_1 \in GF(2)$.

The data path may be described in three steps. First, the inputs may be transformed into composite field $GF((2^4)^2)$; second, the transformations of the AES algorithm may be calculated over the composite field, which may be transformed to operations in $GF(2)$; finally, the output may be transformed back to $GF(2^8)$. This transformation may be represented as a matrix multiplied by a vector. For example, given a number (n) in $GF(2^8)$, the transform matrix from $GF(2^8)$ to $GF((2^4)^2)$ is V. The matrix for the inverse transformation is $V^{-1}$. The corresponding number for n in $GF((2^4)^2)$ is Vn.

The transformations comprising the AES algorithm may be implemented over the composite field. For ShiftRows, the rotation may be the same in different fields. For AddRoundKey, both the state and sub-key may be in $GF((2^4)^2)$. For MixColumns, each column of the state in $GF((2^4)^2)$ may be multiplied by the fixed polynomial $\{03\}x^3+\{01\}x^2+\{01\}x+\{02\}$ with its coefficients also transformed to $GF((2^4)^2)$. For SubBytes, the input and output may both be in the composite field. For each byte substitution, $Byte_{out}=VAV^{-1}(Byte_{in})+Vw$, where A is the affine transformation matrix in $GF(2^8)$, w is the affine transformation constant in $GF(2^8)$ and V is the transformation matrix from $GF(2^8)$ to $GF((2^4)^2)$.

In the composite field, numbers may be divided into more than one piece. Thus, operations performed in the composite field, (e.g. multiplication and multiplicative inverse) may be more efficient than their counterparts in the polynomial binary field. For example, a multiplication over $GF((2^4)^2)$ may be calculated with 3 multiplications over $GF(2^4)$ using the Karatsuba algorithm. In another example, an inverse over $GF((2^4)^2)$ may be calculated with 3 multiplications and 1 inverse over $GF(2^4)$. The multiplications over $GF(2^4)$ are smaller, and thus may be more efficient than their counterparts in $GF((2^4)^2)$. Accordingly, operations over $GF(2^4)$ may be performed as smaller operations over $GF(2^2)$, which may be performed as smaller operations over $GF(2)$.

Figure 2:
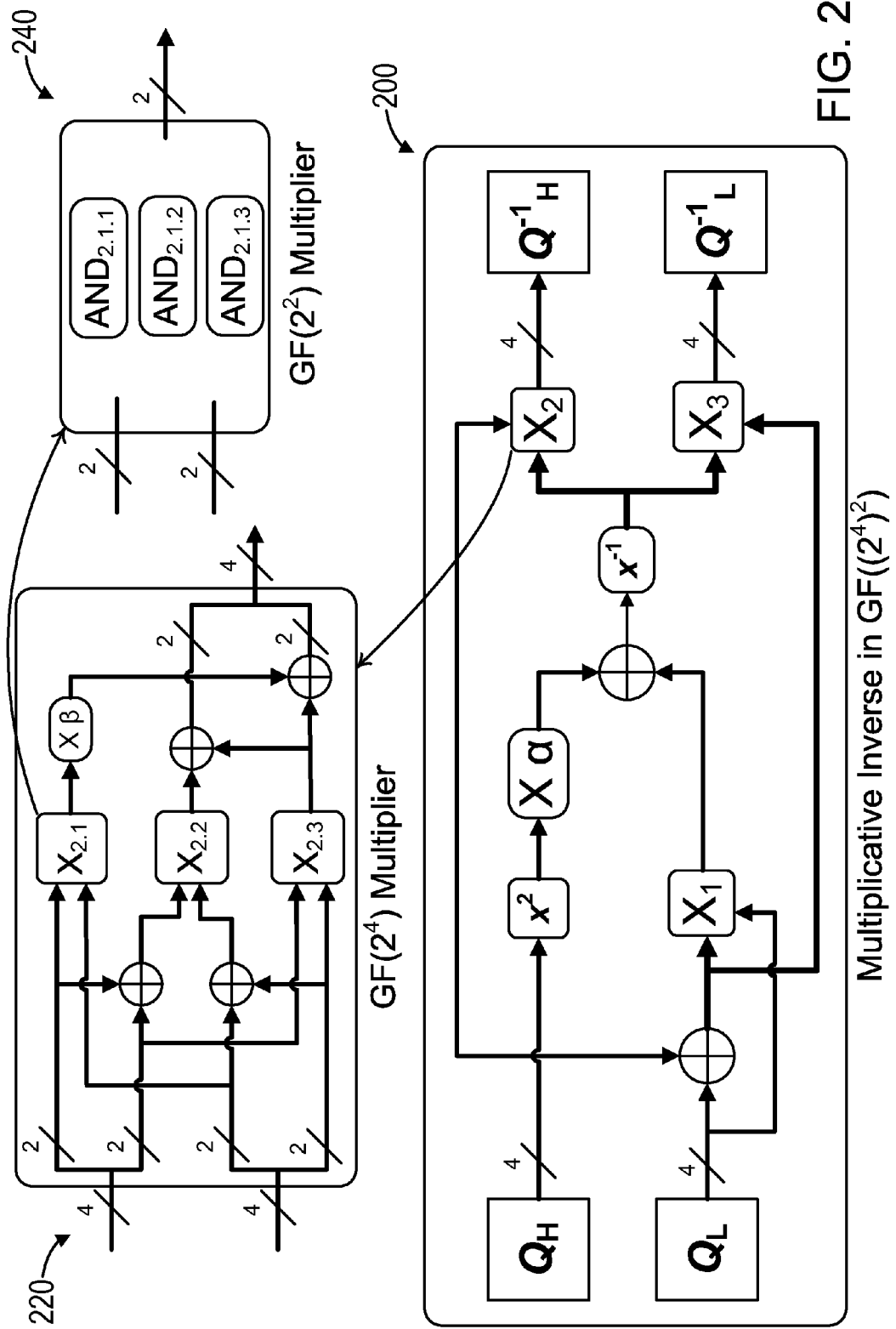
FIG. 2 schematically shows logic for performing an example non-linear transformation in accordance with an embodiment of the present disclosure.

At 200, FIG. 2 schematically shows logic for performing an Example multiplicative inverse operation implemented in composite field $GF((2^4)^2)$. The multiplicative inverse over $GF((2^4)^2)$ may be calculated with 3 multiplications (i.e., $X_1$, $X_2$, $X_3$) and 1 inverse ($x^{-1}$) over $GF(2^4)$. As shown at 220, each $GF(2^4)$ multiplier includes three $GF(2^2)$ multipliers (i.e., $X_{2.1}, X_{2.2}, X_{2.3}$). As shown by way of example at 240, the $GF(2^2)$ multipliers include operations over $GF(2)$, including AND, XOR, OR, MUX, etc. (i.e., $AND_{2.1.1}, AND_{2.1.2}, AND_{2.1.3}$). The AND operations found in each $GF(2^2)$ Multiplier are discussed below with reference to FIG. 5.

Masking may be used as a countermeasure to Side Channel Attacks (SCA). Masking may randomize intermediate values within the AES algorithm that are related to the cipher key. This may be implemented by selecting a number of random bits, then using the random bits to split the original, unmasked intermediate value into several shares. For example, an unmasked value (a) may be split into two pieces $\{a_0, a_1\}$ by a random value m, where $a_0$=a XOR m, and $a_1$=m. This process requires an attacker to observe all of the shares in order to mount a successful attack. The number of random values for each unmasked value is the order of masking. The higher the order, the more difficult it becomes to mount a successful attack.

One such masking scheme is called Boolean masking. In Boolean masking, different shares of a masked variable may be grouped together to obtain the unmasked value through XOR operations. This type of masking scheme is referred to as additive masking. Additive masking may allow the masked shares to pass through a linear function while keeping their relationship. In one example, an unmasked value (a) may be split into three shares $\{a_0, a_1, a_2\}$, f is a linear function, and b=f(a). In this example, b=f($a_0$) XOR f($a_1$) XOR f($a_2$). ShiftRows, MixColumns, and AddRoundKey are all linear functions, and thus may be used with this masking scheme without any modifications.

However, SubBytes is a non-linear multiplicative inverse. To implement Boolean masking, SubBytes may be implemented in another manner, so that each intermediate value within the SBoxes is masked at the $2^{nd}$ order. As discussed above, multiplicative inverse over $GF((2^4)^2)$ may eventually be converted to operations over GF(2), such as XOR, AND, OR, and MUX. XOR and AND are related to the cipher key. XOR is linear and thus may support Boolean masking with no modifications. OR and AND are non-linear functions. Thus, in order to apply $t^{th}$ order Boolean masking to the SubBytes routine, each internal variable of the masked AND operation is masked to the $t^{th}$ or higher-order.

As shown in FIG. 2, a multiplicative inverse over the composite field $GF((2^4)^2)$ includes 36 AND operations in GF(2). For example, the $X_2$ $GF(2^4)$ multiplier shown at 200 includes three $GF(2^2)$ multipliers ($X_{2.1}, X_{2.2}, X_{2.3}$) shown at 220. The $X_{2.1}$ $GF(2^2)$ multiplier includes three AND operations over GF(2) ($AND_{2.1.1}, AND_{2.1.2}, AND_{2.1.3}$). In this manner, each $GF(2^4)$ multiplier includes 9 AND operations. Similarly, the $x^{-1}$ $GF(2^4)$ invertor also includes 9 AND operations (not shown). Each AND operation may utilize c random bits in order to be $t^{th}$-order masked (where $c=t^k(t+1)/2$). In one example, different random bits may be generated for each different AND operation, resulting in 36*c random bits in total. Thus, each SBox would need 36*c random bits, each round would need 576*c random bits, and each AES-128 encryption or decryption would need 5760*c random bits. For example, a $2^{nd}$-order masked AND operation of the current disclosure uses 3 random bits, so 17280 random bits would be used for an AES-128 encryption. This presents a significant demand on the random number generator. This demand may be reduced by eliminating some of the redundant randomness.

In one example, 2 different $2^{nd}$-order masked signals can share one random bit if the other two random bits are not used together as the only two random bits for a third independent signal, or if no further linear operation operates on the signals. As used herein, a first signal is a dependent signal with respect to a second signal if the second signal can be used together with predictable unmasked values to generate the first signal, whereas the first signal is an independent signal with respect to the second signal if the second signal cannot be used together with predictable unmasked values to generate the first signal.

More generally, d different $t^{th}$-order masked signals may share floor(((d−1)*t)/2) random bits if the unshared random bits are not used together as the only random bits for masking another independent signal or no further linear operation operates on the d signals, where d<=t. For example, the following table lists the maximum number of bits that may be shared for $2^{nd}$, $3^{rd}$, and $4^{th}$ order masking:

| t | Minimum bits to mask one AND operation (t + 1)*(t)/2 | d | Maximum shared bits [((d − 1) × t)/2] |
|---|---|---|---|
| 2 | 3 | 2 | 1 |
| 3 | 6 | 2 | 1 |
|   |   | 3 | 3 |
| 4 | 10 | 2 | 2 |
|   |   | 3 | 4 |
|   |   | 4 | 6 |

Given the above conditions, the number of random bits for each SBox can be reduced to as few as 16 random bits for $2^{nd}$ order masking and to as few as 28 random bits for $3^{rd}$ order masking.

Figure 3:
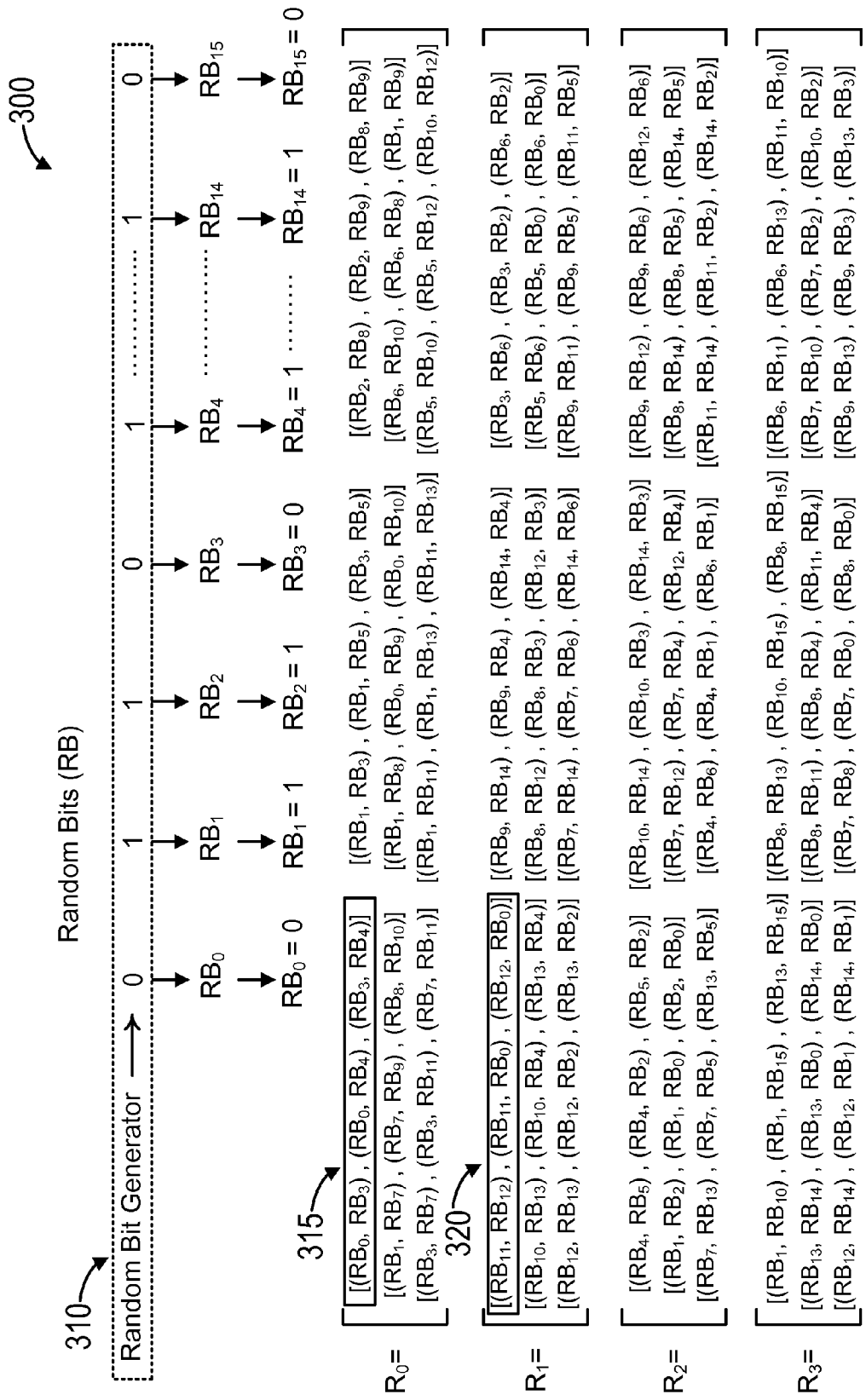
FIG. 3 shows an example set of random bits that may be used to mask non-linear operations in accordance with an embodiment of the present disclosure.

FIG. 3 shows one example 300 of ordering 16 random bits such that a multiplicative inverse over $GF((2^4)^2)$ (which includes 3 multiplications and 1 multiplicative inverse over $GF(2^4)$) may be $2^{nd}$-order masked using only the 16 random bits. A random bit generator 310, such as a random number generator or other tool for machine-generating random or pseudo random numbers, may generate 16 random binary values (e.g., 0 or 1) that can be one-to-one assigned to each of 16 bits ($RB_0, RB_1 \ldots RB_{15}$). These random bits may be received by a masking circuit or algorithm. Further, these random bits may be used to machine-mask non-linear operations, for example non-linear operations of an AES algorithm. It is to be understood that the random bits may be utilized by otherwise standard circuits or algorithms configured to provide $t^{th}$ order masking. In other words, efficiency of standard circuits or algorithms may be improved with the herein described random bit sharing without lowering the order of masking provided by the standard circuits or algorithms.

As shown for $2^{nd}$ order masking in FIG. 3, the random bits may be conceptually organized into mask distribution matrices (e.g., $R_0, R_1, R_2$, and $R_3$). In this example, the $R_0$ matrix includes random bits assigned to the $X_1$ multiplier of FIG. 2, the $R_1$ matrix includes random bits assigned to the $X_2$ multiplier, the $R_2$ matrix includes random bits assigned to the $X_3$ multiplier, and the $R_3$ matrix includes random bits assigned to the inverter. Each row of a matrix includes the mask distribution for a $GF(2^2)$ multiplier. For example, the top row of the $R_1$ matrix includes random bits assigned to the $X_{2.1}$ $GF(2^2)$ multiplier, and the last two rows of the $R_3$ matrix include random bits assigned to two of the $GF(2^2)$ multipliers of the $GF(2^4)$ inverter. Each element of the matrix includes the mask distribution for one AND operation. For example, the top-left element 320 of the $R_1$ matrix includes the mask distribution for $AND_{2.1.1}$ at 240 of FIG. 2. Each element of the matrix includes three pairs of mask bits, and each pair may be used to randomize one masked output signal of an AND operation.

Random bits may be shared according to a variety of different schemes without departing from the scope of this disclosure. FIG. 4 shows one example method 400 of assigning random bits to different non-linear operations to provide $t^{th}$ order masking. While this method conceptualizes random bit assignment with a geometric metaphor, it is to be understood that equivalent assignments may be performed without the geometric visualizations described below. In some embodiments, the assignment of random bits may be random or pseudorandom. In other embodiments, the assignment may be accomplished in a predetermined order, for example, in an order such as to ensure an exhaustive search of all possible subset combinations.

At 410, a set of P random bits is received. The number of random bits that is received varies with the order of masking and the efficiency of design. For example, 16 different random bits are sufficient to provide $2^{nd}$ order masking. It is to be understood, however, that 17 or more different random bits may be used to provide $2^{nd}$ order masking. In another example, 15 or fewer different random bits may be used to provide $2^{nd}$ order masking. As another example, 28 different random bits may be sufficient to provide $3^{rd}$ order masking, although 29 or more different random bits may be used. In another example, 27 or fewer different random bits may be used to provide 3rd order masking. Furthermore, it is to be understood that the P random bits may be received independent of one another without departing from the scope of this disclosure.

At 415, each of the P random bits is assigned to a different point on a graph. Again, such geometric point assignment is presented as a visualization to help illustrate bit assignment. It is to be understood, however, that random bits may be assigned without implementing this geometric metaphor.

At 420, subsets of points are created from the P random bits. Each subset of points includes $(t+1)*t/2$ points, where t is the order of masking. The subsets are created such that no two subsets have more than $floor(((d-1)*t)/2)$ points in common. For example, in the case of $2^{nd}$ order masking, each subset will include a unique combination of three points that collectively form a triangle. Because d only equals 2 for $2^{nd}$ order masking, these triangles will not share more than 1 point. As such, no two triangles share a common edge. In other words, for $2^{nd}$ order masking, a subset of three random bits is eliminated from consideration if that subset includes two of the same random bits that another subset includes. Said another way, subsets of random bits may be created with $(t+1)*t/2$ random bits from the P random bits, such that for each d between 2 and t (inclusive), the union of each group of d subsets has at least $((t+1)*t*d/2)-floor(((d-1)*t)/2)$ elements.

At 425, subsets of points are assigned to AND operations within the $X_2$ and $X_3$ $GF(2^4)$ multipliers and AND operations within the $GF(2^4)$ inverter.

This assignment is performed in a one-to-one manner until all AND operations are assigned one, and only one, subset. Further, the different outputs of each AND operation may be assigned different combinations of the members of the assigned subset. In some embodiments, this may be conceptualized by forming a t+1 by t+1 matrix of elements—Mxy[t+1][t+1], where the two dimensions of the matrix are indexed by x and y. Mxy will include $(t+1)*t/2$ elements in which the x index is greater than the y index. For example, for t=2, these elements are Mxy[2][1], Mxy[3][1], and Mxy[2][3]. Likewise, Mxy will include $(t+1)*t/2$ elements in which the y index is greater than the x index. For example, for t=2, these elements are Mxy[1][2], Mxy[1][3], and Mxy[2][3]. A unique point from a subset is allocated to every element where the x index is greater than the y index. Continuing with the above example and using the values of element 315 of matrix $R_0$ (i.e., $RB_0$ $RB_3$, and $RB_4$): Mxy[2][1]=$RB_0$ Mxy[3][1]=$RB_3$; and Mxy[2][3]=$RB_4$. Then every element where the y index is greater than the x index is assigned a value such that Mxy[x][y]=Mxy[y][x]. As a result, Mxy will include t+1 rows, and each row of Mxy will include t elements. As such, there are a total of $(t+1)*t$ elements. Further, each row will include a different combination of members than all other rows. As such, each row of Mxy may be used to mask one output of a MaskedAND operation.

At 430, it is determined whether the above assignment results in any two AND operations within the same $GF(2^2)$ multiplier sharing a point. If any two AND operations within the same $GF(2^2)$ multiplier share a point, method 400 returns to 425, and the subsets of points are reassigned. When no two AND operations within the same $GF(2^2)$ multiplier share a point, method 400 proceeds to 435.

At 435, it is determined if every internal signal in the $X_2$ and $X_3$ $GF(2^4)$ multipliers and the $GF(2^4)$ inverter are masked to at least the $t^{th}$ order. For example, it is determined if any two signals in the $GF(2^4)$ invertor and $X_2$ and $X_3$ multipliers share the same mask. If the same mask is shared, every internal signal is not masked to at least the $t^{th}$ order. Said another way, every signal is $t^{th}$-order masked if no d, within 1 to t (inclusive), of the relevant internal signals can be used to make a meaningful prediction of any relevant unmasked value. If every relevant internal signal is not masked to at least the $t^{th}$-order, method 400 returns to 425. In this way, subsets are reassigned to AND operations in different permutations until every internal signal is masked to at least the $t^{th}$ order, and method 400 proceeds to 440.

The $X_1$ $GF(2^4)$ multiplier and the remaining $GF(2^2)$ multiplier of the $GF(2^4)$ invertor may be considered apart from the rest of the SBox. For these multipliers, the assignment of random bits may be performed with different constraints, as the different $GF(2^2)$ multipliers included in the $X_1$ $GF(2^4)$ multiplier and the remaining $GF(2^2)$ multiplier of the $GF(2^4)$ invertor can share random bits and it is not necessary to be able to recover the unmasked output of each AND operation included in these $GF(2^2)$ multipliers. Instead, only the unmasked output of $GF(2^2)$ multipliers need be recoverable. As used herein, an output is recoverable if the unmasked value can be generated from different shares of a masked signal. For example, if a signal S is split into three shares (S1, S2, and S3) by two random bits in a $2^{nd}$ order masking design, the unmasked value may be recovered by calculating S from (S1, S2, S3) as S=S1 XOR S2 XOR S3. In one example, the remaining operations are assigned random bits in the following manner.

At 440, different outputs of the AND operations within the $X_1$ $GF(2^4)$ multiplier and the remaining $GF(2^2)$ multiplier of the $GF(2^4)$ invertor are each assigned t of the P random bits.

At 445, it is determined if the outputs of the $GF(2^2)$ multipliers within the $X_1$ $GF(2^4)$ multiplier and the outputs of the first $GF(2^2)$ multiplier within the $GF(2^4)$ inverter are recoverable. If one or more of these outputs cannot be recovered, method 400 returns to 440, where the random bits are reassigned. When each of these unmasked outputs is recoverable, method 400 proceeds to 450.

At 450, it is determined if every signal in the entire design will be masked to at least the $t^{th}$ order with the proposed random bit assignment. Said another way, every signal is $t^{th}$-order masked if no d, within 1 to t (inclusive), of the internal signals can be used to make a meaningful prediction of any relevant unmasked value. If every internal signal is not masked to at least the $t^{th}$-order, method 400 returns to 440. If every internal signal is masked to at least the $t^{th}$-order, method 400 ends.

A MaskedAnd operation may be implemented as an iterative algorithm. As a nonlimiting example, given INPUT: Bit a[t+1], b[t+1], and Bit RB[t+1][t]; the desired OUTPUT: Bit out[t+1] may be obtained via the following iteration:

```
for(i=0; i<t+1; i++)
  k = 0
  out[i] = 0
  for(j=0; j<i; j++)
    out[i] = out[i] xor RB[i][k++]
  end
  out[i] = out[i] xor (a[i] & b[i])
  for(j=i+1; j<t+1; j++)
    out[i] = out[i] xor (RB[i][k++] xor (a[i] & b[j]) xor (a[j] & b[i]))
  end for
end for
```

The algorithm takes inputs (a) and (b), which may be split into (t+1) shares for an AES algorithm that is $t^{th}$ order masked. The inputs are masked with [t+1] [t] random bits that have been assigned to the AND operation via method 400 or similar. The MaskedAnd operation outputs (t+1) values, which may then serve as the input for another function or operation.

Figures 5A, 5B:
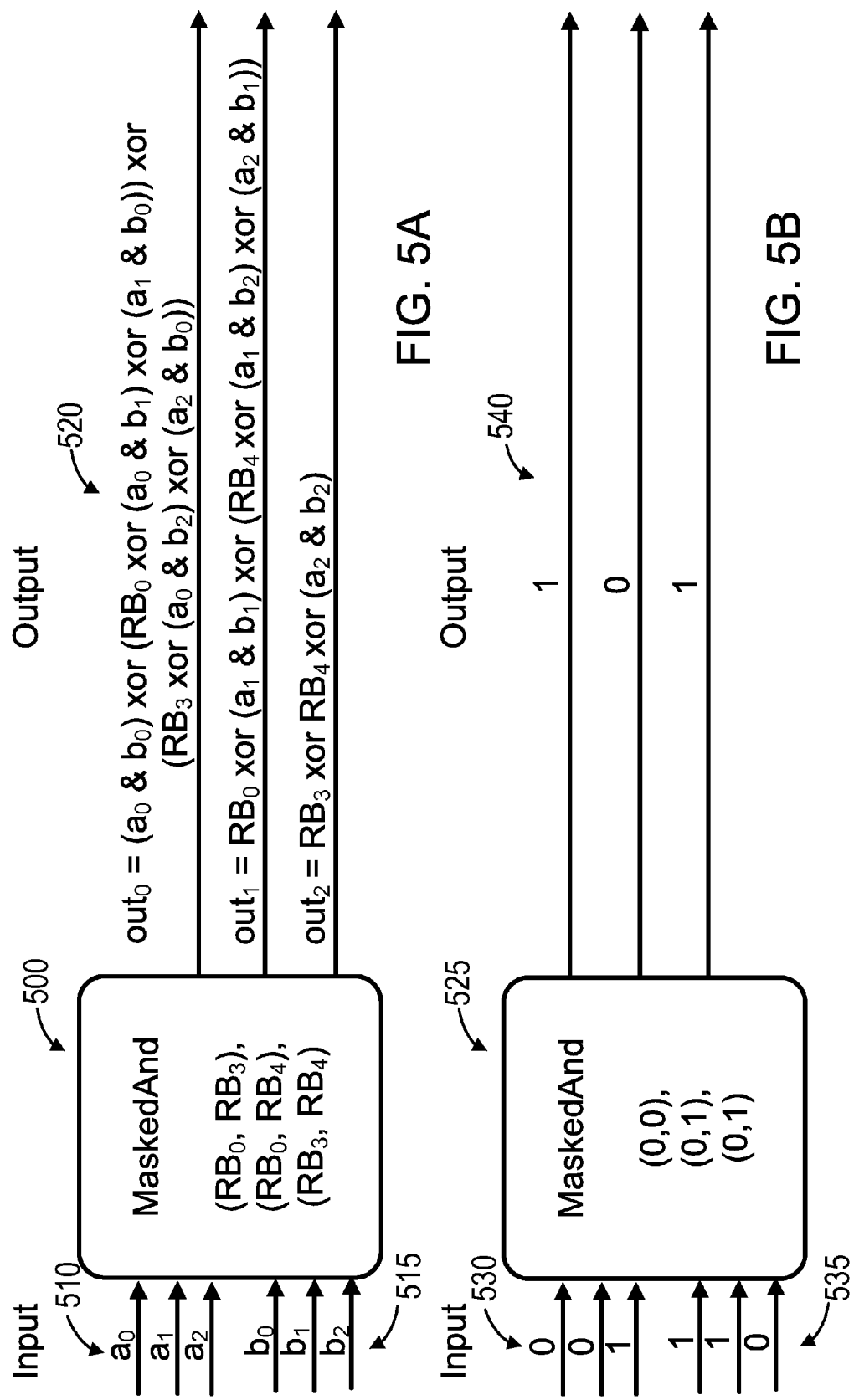
FIG. 5A schematically shows a MaskedAnd operation for a second order mask implementation in accordance with an embodiment of the present disclosure.
FIG. 5B shows example input and output from the MaskedAnd operation of FIG. 5A.

FIG. 5A illustrates the MaskedAnd operation 500 for a masking order of 2. In this example, inputs 510 (a) and 515 (b) have been split into 3 shares ($a_0$, $a_1$, $a_2$ and $b_0$, $b_1$, $b_2$ respectively). The operation yields 3 output values 520 ($out_0$, $out_1$ and $out_2$), with each output value masked by a pair of random bits. The random bits may be assigned to the MaskedAnd operation via method 400, and may be represented as an element of the matrices shown in FIG. 3. In the illustrated example, element 315 of matrix $R_0$ is assigned to MaskedAnd operation 500. As shown in FIG. 5A, output ($out_0$) is a function of $a_0$, $a_1$, $a_2$, $b_0$, $b_1$, $b_2$, $RB_0$ and $RB_3$. Output ($out_1$) is a function of $a_1$, $a_2$, $b_1$, $b_2$, $RB_0$ and $RB_4$. Output ($out_2$) is a function of $a_2$, $b_2$, $RB_3$ and $RB_4$.

FIG. 5B illustrates the MaskedAnd operation 525 as implemented with example input values. In this example, input 530 (input a) includes values $a_0=0$, $a_1=0$ and $a^2=1$, and input 535 (input b) includes values $b_0=1$, $b_1=1$ and $b_2=0$. As shown in FIG. 3, element 315 of matrix $R_0$ includes randomly assigned values of (0,0), (0,1), and (0,1). The output 540 of this MaskedAnd operation would thus be $out_0=1$, $out_1=0$, and $out_2=1$.

The masking methods and processes described herein may be tied to a computing machine. In particular, such methods and processes may be implemented as a network of digital logic gates, a computer-application program or service, an application-programming interface (API), a library, and/or other computer-program product.

Figure 6:
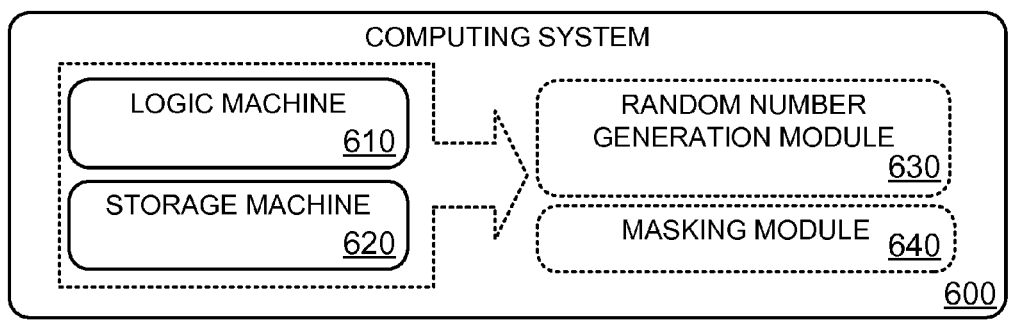
FIG. 6 schematically shows an example computing system configured to machine-generate random bits and machine-mask non-linear operations in accordance with embodiments of the present disclosure.

For example, FIG. 6 schematically shows a non-limiting embodiment of a computing system 600 that can enact the masking methods and processes described herein. Computing system 600 is shown in simplified form. Computing system 600 may take the form of a network of digital logic gates, one or more integrated circuits, one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. As shown in FIG. 6, logic machine 610 and storage machine 620 may individually or collectively enable a random number generation module 630 configured to machine-generate random bits and/or a masking module 640 configured to machine-mask non-linear logical operations, as described above.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions (e.g., a network of digital logic gates hardwired to implement a desired algorithm). Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods and processes described herein. When such methods and processes are implemented, the state of storage machine 620 may be transformed—e.g., to hold different data.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A machine that secures circuit-to-circuit communication, comprising:
  a processor configured to:
    receive a random bit;
    generate two or more masks including at least the random bit;
    apply a first mask of the two or more masks to mask an output of a first non-linear logical function at a first circuit to generate a first masked output, the output of the first non-linear logical function masked to a second or higher order; and apply a second mask of the two or more masks to mask an output of a second non-linear logical function at a second circuit to generate a second masked output, the output of the second non-linear logical function masked to a second or higher order; and an interface in communication with the processor, the interface configured to communicate the first masked output from the first circuit and the second masked output from the second circuit to one or more additional circuits.

2. The machine of claim 1, wherein the random bit is one of a set of random bits, and wherein each different non-linear logical function is masked by a different subset of two or more random bits drawn from the set of random bits.

3. The machine of claim 2, wherein no subset of random bits used to mask a non-linear logical function includes only random bits found in any two other unique subsets of random bits that share a random bit with one another.

4. The machine of claim 2, wherein a subset of random bits used to mask a non-linear logical function includes only random bits found in two other unique subsets of random bits that share a random bit with one another, and wherein no direct linear function uses a masked output randomized by those two other unique subsets of random bits.

5. The machine of claim 1, wherein the first and second non-linear logical functions are included in a non-linear transformation, the non-linear transformation including a plurality of non-linear logical functions including the first non-linear logical function and the second non-linear logical function.

6. The machine of claim 5, wherein the non-linear transformation is executed as part of a SubByte transformation of an Advanced Encryption Standard encryption or decryption.

7. The machine of claim 1, wherein the first and second non-linear logical functions are masked with a Boolean masking scheme.

8. The apparatus machine of claim 1, wherein the first circuit and second circuit are subcomponents of the processor.

9. A device, comprising:
a first circuit configured to receive two or more random bits and to output two or more masks, wherein a first mask and a second mask of the two or more masks both include a first bit of the two or more random bits;
a second circuit configured to receive the two or more masks, to select a selected mask from the two or more masks, and to apply the selected mask to an output of a non-linear logical function to generate a second or higher order masked output; and
a third circuit configured to receive the masked output and to transmit the masked output.

10. The device of claim 9, wherein the non-linear logical function is one of M number of non-linear logical functions included in a non-linear transformation, wherein M is an integer greater than 1.

11. The device of claim 10, wherein the two or more random bits are drawn from a set of random bits, and wherein each different non-linear logical function is masked by a different subset of two or more random bits drawn from the set of random bits.

12. The device of claim 11, wherein no subset of random bits used to mask a non-linear logical function includes only random bits found in any two other unique subsets of random bits that share a random bit with one another.

13. The device of claim 11, wherein a subset of random bits used to mask a non-linear logical function includes only random bits found in two other unique subsets of random bits that share a random bit with one another, and wherein no direct linear function uses a masked output randomized by those two other unique subsets of random bits.

14. The device of claim 11, wherein the masked output is masked to a $t^{th}$ order, wherein each mask includes c or more random bits, and wherein a total number P of random bits utilized to mask the M number of non-linear logical functions is less than c×M, wherein t, and c are integers greater than 1.

15. The device of claim 14, wherein $c = (t*(t+1)/2)$.

16. The device of claim 15, wherein $t = 2$ and $M = 36$.

17. The device of claim 14, wherein $P = 16$.

18. A method that secures circuit-to-circuit communication, the method comprising:
receiving a random bit;
generating two or more masks including at least the random bit;
applying a first mask of the two or more masks to mask an output of a first non-linear logical function at a first circuit to generate a first masked output, the output of the first non-linear logical function masked to a second or higher order;
applying a second mask of the two or more masks to mask an output of a second non-linear logical function at a second circuit to generate a second masked output, the output of the second non-linear logical function masked to a second or higher order; and
sending the first masked output and the second masked output.

19. The method of claim 18, wherein:
the first and second non-linear logical functions are included in a non-linear transformation, the non-linear transformation including M number of non-linear logical functions including the first non-linear logical function and the second non-linear logical function, wherein M is an integer greater than 1;
an output of each non-linear logical function is masked to a $t^{th}$ order, wherein t is an integer greater than 1;
the random bit is one of a set of random bits, and each different non-linear logical function is masked by a different subset of c or more random bits drawn from the set of random bits, wherein $c = (t*(t+1)/2)$; and
the set of random bits utilized to mask the M number of non-linear logical functions includes a total number of P random bits, wherein P is less than c×M.

* * * * *